US009803757B2

(12) United States Patent
Liu et al.

(10) Patent No.: US 9,803,757 B2
(45) Date of Patent: Oct. 31, 2017

(54) AUTO-SWITCHING TEE JOINT, DEVICE AND METHOD FOR WASHING AND DRYING CLAMPS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Laifeng Liu, Beijing (CN); Jiayong Dong, Beijing (CN); Qiang Xiang, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 168 days.

(21) Appl. No.: 14/742,772

(22) Filed: Jun. 18, 2015

(65) Prior Publication Data

US 2016/0153570 A1    Jun. 2, 2016

(51) Int. Cl.
*F16K 11/048*    (2006.01)
*F16K 11/087*    (2006.01)
(Continued)

(52) U.S. Cl.
CPC ............. *F16K 11/048* (2013.01); *B08B 3/02* (2013.01); *F16K 11/056* (2013.01);
(Continued)

(58) Field of Classification Search
CPC ..... F26K 11/087; F26K 27/0245; B08B 3/02; F26B 1/00
See application file for complete search history.

(56) References Cited

U.S. PATENT DOCUMENTS

| 3,447,556 A * | 6/1969 | Howeth | F15B 11/17 137/112 |
| 5,143,529 A * | 9/1992 | Means, Jr. | B08B 5/02 134/22.12 |
| 2003/0005948 A1 * | 1/2003 | Matsuno | B08B 3/04 134/33 |

FOREIGN PATENT DOCUMENTS

| CN | 101372001 A | 2/2009 |
| CN | 102537618 A | 7/2012 |

(Continued)

OTHER PUBLICATIONS

Office Action in Chinese Patent Application No. 201410705403.6, dated Apr. 18, 2016.

*Primary Examiner* — Saeed T Chaudhry
(74) *Attorney, Agent, or Firm* — Brooks Kushman P.C.

(57) ABSTRACT

The present disclosure discloses an auto-switching tee joint, including a transitional tube, a first inlet tube, a second inlet tube and an outlet tube. The first inlet tube and the second inlet tube are disposed at two ends of the transitional tube, and the outlet tube is connected at a side wall of the transitional tube. In the transitional tube, there is provided with a switching ball which is movable freely. Both the first inlet tube and the second inlet tube have a bell-mouth which faces the transitional tube. The switching ball has a diameter larger than a minimum inner diameter of the bell-mouth and larger than an inner diameter of the outlet tube. The present disclosure further provides a device for washing and drying clamps which adopts the above auto-switching tee joint and can accomplish the washing and drying of clamps, save costs and improve working efficiency.

16 Claims, 3 Drawing Sheets

(51) Int. Cl.
*B08B 3/02* (2006.01)
*F16K 27/02* (2006.01)
*F16K 11/056* (2006.01)
*F26B 21/00* (2006.01)

(52) U.S. Cl.
CPC ........ *F16K 11/087* (2013.01); *F16K 27/0245* (2013.01); *F26B 21/004* (2013.01)

(56) References Cited

FOREIGN PATENT DOCUMENTS

| | | |
|---|---|---|
| CN | 203335931 U | 12/2013 |
| CN | 203797039 U | 8/2014 |
| CN | 203816957 U | 9/2014 |
| KR | 100453365 B1 | 4/2005 |

* cited by examiner

AUTO-SWITCHING TEE JOINT, DEVICE AND METHOD FOR WASHING AND DRYING CLAMPS

CROSS-REFERENCE TO RELATED APPLICATION

This application claims priority to Chinese Patent Application No. 201410705403.6 filed on Nov. 28, 2014, the disclosures of which are incorporated in their entirety by reference herein.

TECHNICAL FIELD

The present disclosure relates to the field of washing clamps, in particular to an auto-switching tee joint, a device and method for washing and drying clamps.

BACKGROUND

With the development of the thin film transistor-liquid crystal display (TFT-LCD) technology, higher requirements for a quality control of products are put forward in the production process.

In the whole TFT-LCD production process, as a box for loading a transparent (such as glass) substrate, a clamp is very important. The clamp passes through each section in the TFT-LCD production process, which makes the work environment of the clamp is very complex. Therefore, the clamp is easy to be polluted. In order to improve the yield rate of final products, it needs to wash and dry the clamp effectively and frequently.

FIG. 1 is a schematic diagram showing a structure of a washing part in a device for washing and drying clamps in the related art. The washing part includes a washing chamber 101, a clamp 102 rotatablely disposed in the washing chamber 101, and tubular nozzles 103 provided at the left, right and top sides of the clamp 102, respectively. A water flow rate and a water inflow amount for each tubular nozzle 103 is controlled by a separate component. In a specific washing process, the clamp 102 is rotated and the washing part usually washes the clamp by spraying water from the periphery of the clamp. However, when the clamp 102 is washed by the washing part in the related art, the clamp 102 is not thoroughly washed. In addition, since the washing part and a drying part are disposed separately, thus, transportation is required from the washing process to the drying process, which increases cost.

SUMMARY

An object of the present disclosure is to provide an auto-switching tee joint, which can achieve automatic switching between supplying water and supplying air; meanwhile, a device and method for washing and drying clamps are provided, so as to enable to wash and dry the clamps in a single chamber, which can save costs and improve working efficiency.

In order to solve the above problems, the present disclosure provides an auto-switching tee joint, including a transitional tube, a first inlet tube, a second inlet tube and an outlet tube; wherein the first inlet tube and the second inlet tube are disposed at two ends of the transitional tube, and the outlet tube is connected at a side wall of the transitional tube; in the transitional tube, there is provided with a switching ball which is movable freely; both the first inlet tube and the second inlet tube have a bell-mouth which faces the transitional tube; the switching ball has a diameter larger than a minimum inner diameter of the bell-mouth and larger than an inner diameter of the outlet tube.

Further, inner walls of the bell-mouths of both the first inlet tube and the second inlet tube are provided with a sealing ring, respectively.

Further, each of the sealing rings has a cooperating surface cooperating with the switching ball; each of the cooperating surfaces is a part of a spherical surface.

Further, the bell-mouth of the first inlet tube faces the bell-mouth of the second inlet tube.

Further, the outlet tube is disposed between the bell-mouth of the first inlet tube and the bell-mouth of the second inlet tube.

Further, a transitional portion between the transitional tube and the outlet tube is provided with a plurality of notches.

Further, the switching ball is a steel ball.

The present disclosure further provides a device for washing and drying a clamp, including a washing and drying chamber, and a washing and drying unit provided at top of the washing and drying chamber and corresponding to a central position of the clamp; wherein the washing and drying unit includes a retractable sleeve group and an auto-switching tee joint; wherein the sleeve group is formed by sleeving multi-levels of sleeves with different outer diameters in turn, each level of the sleeves is provided with a plurality of nozzles; wherein the auto-switching tee joint includes a transitional tube, a first inlet tube, a second inlet tube and an outlet tube; the first inlet tube and the second inlet tube are disposed at two ends of the transitional tube; the outlet tube is connected at a side wall of the transitional tube; in the transitional tube, there is provided with a switching ball which is movable freely; both the first inlet tube and the second inlet tube have a bell-mouth, and the bell-mouth faces the transitional tube; the switching ball has a diameter larger than a minimum inner diameter of the bell-mouth and larger than an inner diameter of the outlet tube; the first inlet tube and the second inlet tube are connected to a water supply unit and an air supply unit, respectively; and the outlet tube is connected to the sleeve group.

Further, the washing and drying unit further includes a motor, two reels and two lifting ropes; wherein lifting rings are provided at two sides of the sleeve group, respectively; one end of the lifting rope is winded on the reel, and the other end is connected with the lifting ring; the motor is configured to drive the reels to rotate.

Further, there are three sleeves.

Further, when the sleeve group is in a retracted state, nozzles in every two adjacent sleeves are aligned in a one-to-one manner.

The present disclosure further provides a method for washing and drying a clamp by using the above device, including: adjusting an elongated length of a sleeve group in the device, according to size of the clamp to be processed; supplying a first fluid into a first inlet tube of an auto-switching tee joint in the device in such a manner that a pressure of the first fluid forces a switching ball in the auto-switching tee joint to form a sealing structure between the switching ball and a bell-mouth of a second inlet tube in the auto-switching tee joint; processing the clamp to be processed via the first fluid flowing through an outlet tube of the auto-switching tee joint and nozzles in the sleeve group.

Further, the method further includes supplying a second fluid into the second inlet tube in such a manner that a pressure of the second fluid forces the switching ball to form a sealing structure between the switching ball and a bell-mouth of the first inlet tube; further processing the clamp which has been processed by the first fluid via the second fluid flowing through the outlet tube and the nozzles in the sleeve group.

Further, the first fluid is water and the second fluid is air.

In the auto-switching tee joint provided in the present disclosure, the tee joint can be automatically switched by the switching ball which is movable freely. Meanwhile, the present disclosure provides a device and method for washing and drying clamps which adopts the above auto-switching tee joint and can accomplish the washing and drying in a same chamber, save costs and improve working efficiency.

DETAILED DESCRIPTION

Embodiments of the present disclosure will be further described in details hereinafter in conjunction with the accompanying drawings and examples. The following embodiments are merely used to illustrate the present disclosure, but not intended to limit the scope of the present disclosure.

Figure 1:
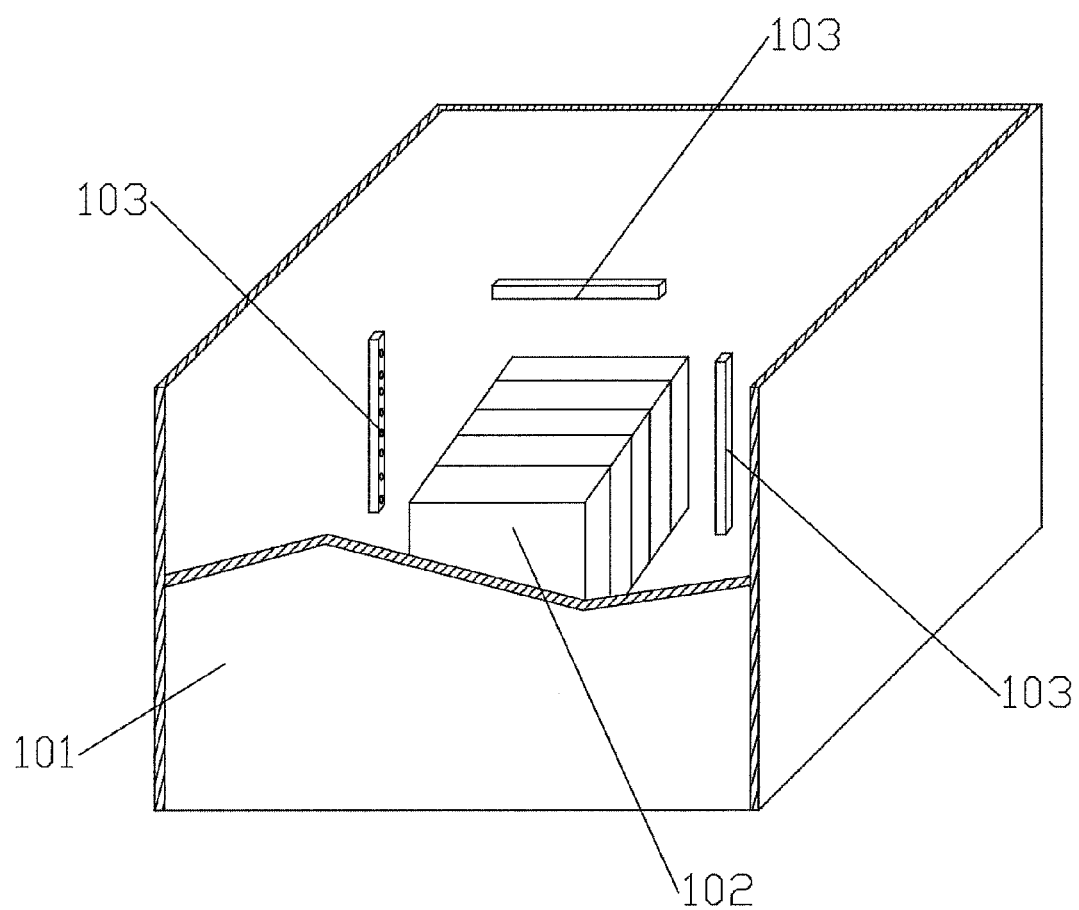
FIG. 1 a schematic diagram showing a structure of a washing part of a device for washing and drying clamps in the related art.
Figure 2:
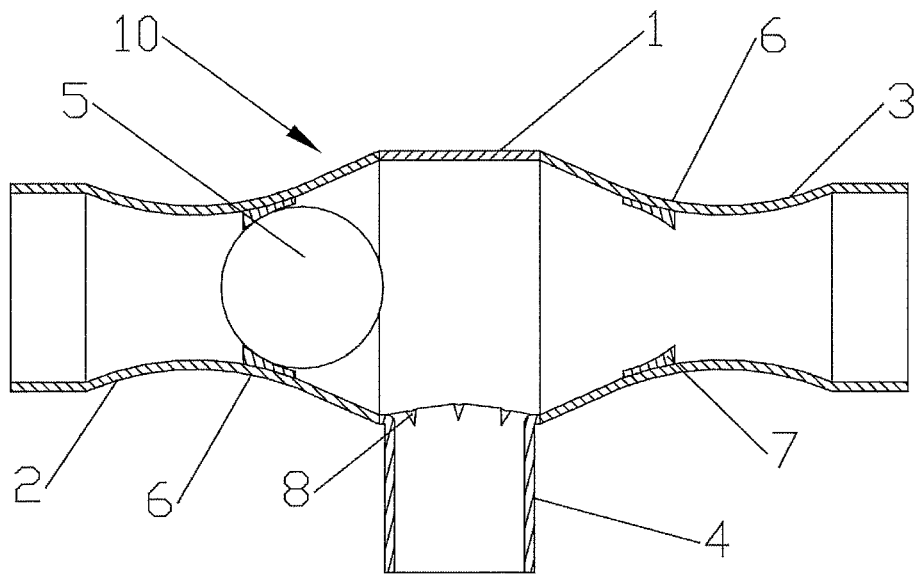
FIG. 2 is a sectional view showing an auto-switching tee joint according to one embodiment of the present disclosure.

Referring to FIG. 2, the present disclosure provides an auto-switching tee joint 10, which includes a first inlet tube 2, a second inlet tube 3, an outlet tube 4 and a transitional tube 1. The first inlet tube 2 and the second inlet tube 3 are disposed at two ends of the transitional tube 1, and connected to the two ends of the transitional tube 1, respectively. The outlet tube 4 is connected to a side wall of the transitional tube 1, thereby forming a tee joint body. In the transitional tube 1, there is provided with a switching ball 5 which is movable freely. Preferably, the switching ball 5 is a steel ball. Both the first inlet tube 2 and the second inlet tube 3 have a bell-mouth 6 with an open facing the transitional tube 1. The switching ball 5 has a diameter larger than a minimum inner diameter of the bell-mouths 6 and an inner diameter of the outlet tube 4.

When used, the first inlet tube 2 is connected to a water supply unit, and the second inlet tube 3 is connected to an air supply unit. When supplying water, the air supply unit is closed and the water supply unit is opened. Water enters from the first inlet tube 2 and the switching ball 5 is forced into the second inlet tube 3 under a pressure of the water. Since the minimum inner diameter of the bell-mouth 6 is smaller than the diameter of the switching ball 5, thus the switching ball 5 is blocked at an inner wall of the bell-mouth 6 in the second inlet tube 3, thereby forming a sealing structure. Then, the water flows out from the outlet tube 4. When switching from supplying water to supplying air, the water supply unit is closed and the air supply unit is opened. At this time, air enters from the second inlet tube 3 and the switching ball 5 is forced into the first inlet tube 2. The switching ball 5 is blocked at the inner wall of the bell-mouth 6 in the first inlet tube 2, thereby forming a sealing structure. Then, the air flows out from the outlet tube 4. So the switching is done. The auto-switching tee joint 10 according to the present disclosure has a simple structure, is easy to use and can switch automatically.

Further, the inner walls of the bell-mouths 6 in the first inlet tube 2 and the second inlet tube 3 are provided with sealing rings 7. The switching ball 5 can fit and seal the inner wall of the first inlet tube 2 or the second inlet tube 3 in a better manner through the sealing rings 7.

Further, a transitional portion between the transitional tube 1 and the outlet tube 4 is provided with a plurality of notches 8. The notches 8 preferably are serrated notches. A depressed portion is formed in a connection portion between the transitional tube 1 and the outlet tube 4. When not used, the switching ball 5 can fall within the depressed portion, and it is difficult for the switching ball 5 to leave from the depressed portion under a pressure when being sealed by liquid. However, the presence of the notches 8 can prevent occurrence of being sealed by liquid.

In addition to adopting a streamlined structure with a constricted middle section in the outer side as shown in FIG. 2, the bell-mouths of the first inlet tube 2 and the second inlet tube 3 may further be provided with streamlined protrusions in the inner sides of the first inlet tube 2 and the second inlet tube 3 without changing the outer structure.

Figure 3:
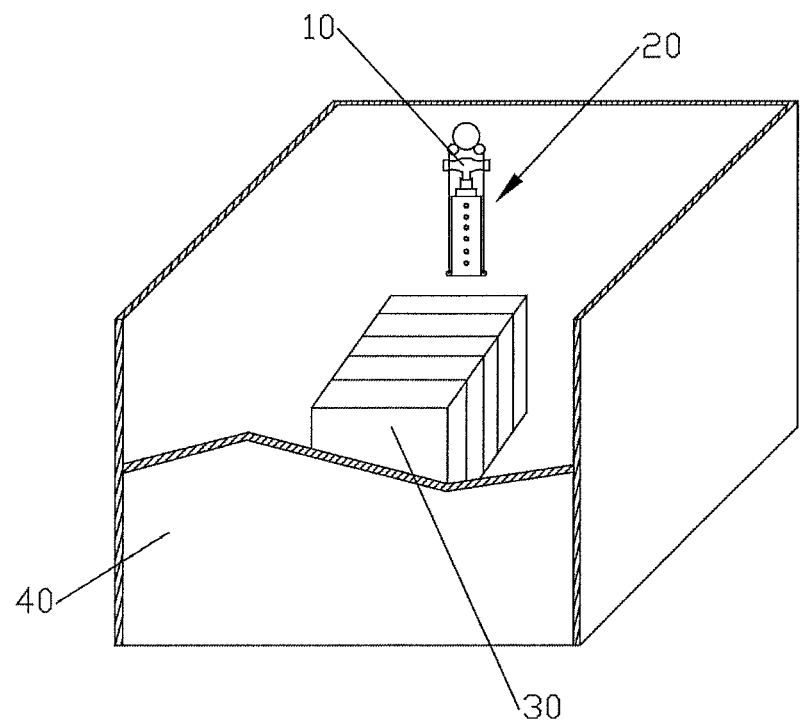
FIG. 3 is a schematic diagram showing a structure of a device for washing and drying clamps according to one embodiment of the present disclosure.

As shown in FIGS. 2 and 3, the present disclosure further provides a device for washing and drying clamps, including: a washing and drying chamber 40 configured to hold clamps 30. A washing and drying unit 20 is disposed at a top of the washing and drying chamber 40 and corresponds to a central position of the clamps 30. The washing and drying unit 20 includes a retractable sleeve group 25 and an auto-switching tee joint 10. The sleeve group 25 is formed by sleeving multilevel of sleeves 26 with different outer diameters in turn. In one embodiment, the number of the sleeves 26 is three. Each level of sleeves 26 is provided with a plurality of nozzles 27. The auto-switching tee joint 10 uses the above-described auto-switching tee joint, which includes the first inlet tube 2, the second inlet tube 3, the outlet tube 4 and the transitional tube 1. The first inlet tube 2 and the second inlet tube 3 are disposed at two ends of the transitional tube 1, and connected to the two ends of the transitional tube 1, respectively. The outlet tube 4 is connected to a side wall of the transitional tube 1, thereby forming a tee joint body. In the transitional tube 1, there is provided with a switching ball 5 which is movable freely. Preferably, the switching ball 5 is a steel ball. Both the first inlet tube 2 and the second inlet tube 3 have a bell-mouth 6. The diameter of the switching ball 5 is larger than a minimum inner diameter of the bell-mouths 6 and an inner diameter of the outlet tube, The first inlet tube 2 and the second inlet tube 3 are connected to the water supply unit and the air supply unit, respectively. The outlet tube 4 and the sleeve group 25 are connected.

Figure 4:
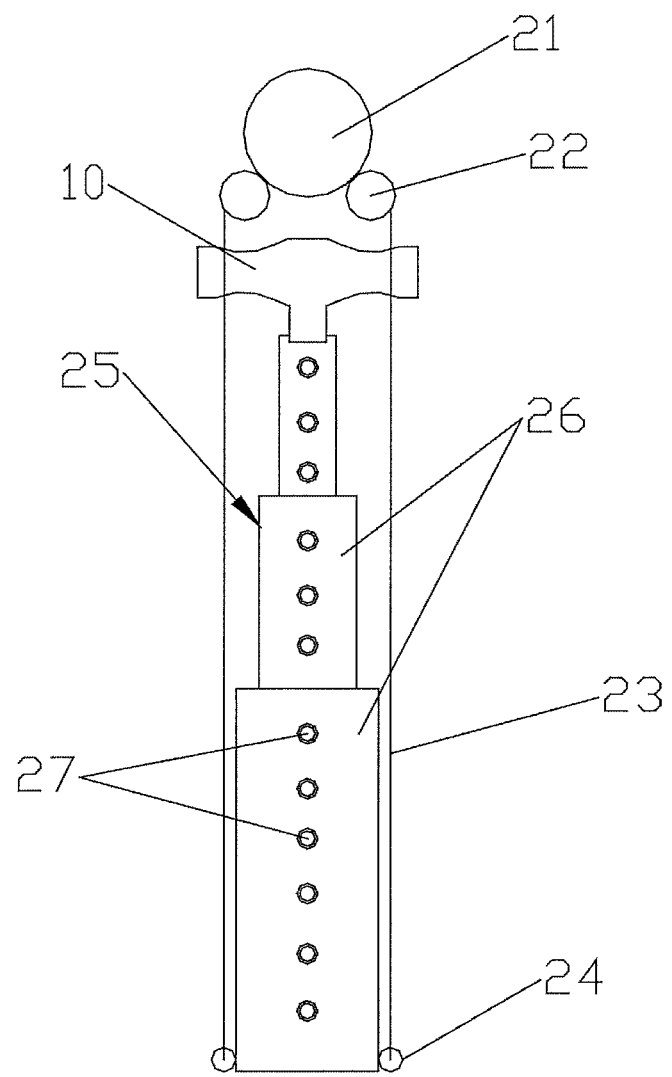
FIG. 4 is an enlarged schematic diagram showing a washing and drying unit of the device for washing and drying clamps according to one embodiment of the present disclosure.

Further, as shown in FIG. 4, the washing and drying unit 20 further includes a motor 21, two reels 22 and two lifting ropes 23. Lifting rings 24 are provided at two sides of the sleeve group 25, respectively. One end of the lifting rope 23 is winded on the reel 22 while the other end is connected to the lifting ring 24. The motor 21 drives the reels 22 to rotate. When the reels 22 are rotated, the lifting ropes are winded in or out so as to elongate or retract the sleeve group 25. In one embodiment, the lifting ropes are steel ropes.

When the device for washing and drying clamps according to the present disclosure is used to wash and dry clamps, it is only needed to switch switches of the air supply unit and the water supply unit so that the tee joint can be automatically switched by the switching ball. Therefore, the device with one chamber integrated with functions of washing and drying can accomplish the washing and drying of the clamps, thereby saving a chamber, reducing the cost, saving work time of moving the clamps and improving the working efficiency.

The above is only preferred embodiments of the present disclosure, and is not intended to limit the present disclosure. All the changes, equivalent substitutions and improvements in the spirit and principle of the present disclosure should fall within the protection scope of the present disclosure.

What is claimed is:

1. An auto-switching tee joint, comprising a transitional tube, a first inlet tube, a second inlet tube and an outlet tube; wherein the first inlet tube and the second inlet tube are disposed at two ends of the transitional tube, and the outlet tube is connected at a side wall of the transitional tube; in the transitional tube, there is provided with a switching ball which is movable freely; both the first inlet tube and the second inlet tube have a bell-mouth which faces the transitional tube; the switching ball has a diameter larger than a minimum inner diameter of the bell-mouth and larger than an inner diameter of the outlet tube;
   wherein inner walls of the bell-mouths of both the first inlet tube and the second inlet tube are provided with a sealing ring, respectively; and
   wherein each of the sealing rings has a cooperating surface cooperating with the switching ball; each of the cooperating surfaces is a part of a spherical surface before and after being in engagement with the switching ball;
   wherein each of the cooperating surfaces is a part of a circle in a longitudinal cross-section of the auto-switching tee joint;
   wherein the sealing rings protrude from the inner walls of the bell-mouths of both the first inlet tube and the second inlet tube, respectively.

2. The auto-switching tee joint according to claim 1, wherein the bell-mouth of the first inlet tube faces the bell-mouth of the second inlet tube.

3. The auto-switching tee joint according to claim 2, wherein the outlet tube is disposed between the bell-mouth of the first inlet tube and the bell-mouth of the second inlet tube.

4. The auto-switching tee joint according to claim 1, wherein a transitional portion between the transitional tube and the outlet tube is provided with a plurality of notches.

5. The auto-switching tee joint according to claim 1, wherein the switching ball is a steel ball.

6. A device for washing and drying a clamp, comprising a washing and drying chamber, and a washing and drying unit provided at top of the washing and drying chamber and corresponding to a central position of the clamp;
   wherein the washing and drying unit comprises a retractable sleeve group and an auto-switching tee joint;
   wherein the sleeve group is formed by sleeving multi-levels of sleeves with different outer diameters in turn, and each level of the sleeves is provided with a plurality of nozzles;
   wherein the auto-switching tee joint comprises a transitional tube, a first inlet tube, a second inlet tube and an outlet tube; the first inlet tube and the second inlet tube are disposed at two ends of the transitional tube; the outlet tube is connected at a side wall of the transitional tube; in the transitional tube, there is provided with a switching ball which is movable freely; both the first inlet tube and the second inlet tube have a bell-mouth, and the bell-mouth faces the transitional tube; the switching ball has a diameter larger than a minimum inner diameter of the bell-mouth and larger than an inner diameter of the outlet tube; the first inlet tube and the second inlet tube are connected to a water supply unit and an air supply unit, respectively; and the outlet tube is connected to the sleeve group;
   wherein inner walls of the bell-mouths of both the first inlet tube and the second inlet tube are provided with a sealing ring, respectively; and
   wherein each of the sealing rings has a cooperating surface cooperating with the switching ball; each of the cooperating surfaces is a part of a spherical surface before and after being in engagement with the switching ball;
   wherein each of the cooperating surfaces is a part of a circle in a longitudinal cross-section of the auto-switching tee joint;
   wherein the sealing rings protrude from the inner walls of the bell-mouths of both the first inlet tube and the second inlet tube, respectively.

7. The device according to claim 6, wherein the washing and drying unit further comprises a motor, two reels and two lifting ropes; wherein lifting rings are provided at two sides of the sleeve group, respectively; one end of the lifting rope is winded on the reel, and the other end is connected with the lifting ring; the motor is configured to drive the reels to rotate.

8. The device according to claim 6, wherein there are three sleeves.

9. The device according to claim 6, wherein when the sleeve group is in a retracted state, nozzles in every two adjacent sleeves are aligned in a one-to-one manner.

10. The device according to claim 6, wherein the bell-mouth of the first inlet tube faces the bell-mouth of the second inlet tube.

11. The device according to claim 10, wherein the outlet tube is disposed between the bell-mouth of the first inlet tube and the bell-mouth of the second inlet tube.

12. The device according to claim 6, wherein a transitional portion between the transitional tube and the outlet tube is provided with a plurality of notches.

13. The device according to claim 6, wherein the switching ball is a steel ball.

14. A method for washing and drying a clamp by using the device according to claim 6, comprising:
   adjusting an elongated length of a sleeve group in the device, according to size of the clamp to be processed;
   supplying a first fluid into a first inlet tube of an auto-switching tee joint in the device in such a manner that a pressure of the first fluid forces a switching ball in the auto-switching tee joint to form a sealing structure between the switching ball and a bell-mouth of a second inlet tube in the auto-switching tee joint;
   processing the clamp to be processed via the first fluid flowing through an outlet tube of the auto-switching tee joint and nozzles in the sleeve group.

15. The method according to claim 14, further comprising:
   supplying a second fluid into the second inlet tube in such a manner that a pressure of the second fluid forces the switching ball to form a sealing structure between the switching ball and a bell-mouth of the first inlet tube;

further processing the clamp which has been processed by the first fluid via the second fluid flowing through the outlet tube and the nozzles in the sleeve group.

16. The method according to claim 15, wherein the first fluid is water and the second fluid is air.

\* \* \* \* \*